(12) United States Patent
Byrne et al.

(10) Patent No.: US 10,873,167 B2
(45) Date of Patent: Dec. 22, 2020

(54) ELECTRICAL RECEPTACLE FOR FURNITURE

(71) Applicants: Norman R. Byrne, Ada, MI (US); Daniel P. Byrne, Lowell, MI (US); Joseph D. Ward, Grand Rapids, MI (US); Aaron G. Lautenbach, Rockford, MI (US); Roger D. Burdi, Grand Rapids, MI (US)

(72) Inventors: Norman R. Byrne, Ada, MI (US); Daniel P. Byrne, Lowell, MI (US); Joseph D. Ward, Grand Rapids, MI (US); Aaron G. Lautenbach, Rockford, MI (US); Roger D. Burdi, Grand Rapids, MI (US)

( * ) Notice: Subject to any disclaimer, the term of this patent is extended or adjusted under 35 U.S.C. 154(b) by 15 days.

(21) Appl. No.: 16/004,865

(22) Filed: Jun. 11, 2018

(65) Prior Publication Data

US 2018/0358765 A1   Dec. 13, 2018

Related U.S. Application Data

(60) Provisional application No. 62/518,580, filed on Jun. 12, 2017.

(51) Int. Cl.
| | |
|---|---|
| *H02J 3/00* | (2006.01) |
| *H01R 25/00* | (2006.01) |
| *H01R 13/73* | (2006.01) |
| *H02J 7/00* | (2006.01) |
| *A47B 21/06* | (2006.01) |

(Continued)

(52) U.S. Cl.
CPC ........... *H01R 25/006* (2013.01); *A47B 21/06* (2013.01); *H01R 13/73* (2013.01); *H02J 1/00* (2013.01); *H02J 7/00* (2013.01); *H02J 7/0047* (2013.01); *A47B 2021/066* (2013.01); *A47B 2200/0081* (2013.01); *A61G 13/101* (2013.01); *A61G 15/10* (2013.01); *H01R 13/6675* (2013.01); *H01R 13/7175* (2013.01); *H02J 7/0042* (2013.01)

(58) Field of Classification Search
CPC .................................................. H01R 25/006
USPC ............................................................ 307/11
See application file for complete search history.

(56) References Cited

U.S. PATENT DOCUMENTS

| | | |
|---|---|---|
| 4,372,629 A | 2/1983 | Propst et al. |
| 4,551,577 A | 11/1985 | Byrne |

(Continued)

*Primary Examiner* — Rexford N Barnie
*Assistant Examiner* — Dru Parries
(74) *Attorney, Agent, or Firm* — Gardner, Linn, Burkhart & Ondersma LLP

(57) ABSTRACT

A furniture electrical system includes an electrical power unit including a housing that is mountable to a furniture article and that defines an interior cavity, with a low voltage DC electrical outlet positioned in the interior cavity. An electrical power cord is in electrical communication with the electrical outlet and exits the housing, the power cord extending to a higher voltage DC power supply associated with an electric motor for raising and lowering a furniture article. An electrical power converter in the housing reduces the voltage from the higher voltage DC power supply to the low voltage DC electrical outlet. Optionally, an indicia lamp associated with each outlet illuminates at a first luminous intensity when the outlet is energized, and illuminates at a different second luminous intensity when the outlet is energized and supplying power to an electrical power consumer.

18 Claims, 10 Drawing Sheets

(51) Int. Cl.
*H02J 1/00* (2006.01)
*H01R 13/717* (2006.01)
*H01R 13/66* (2006.01)
*A61G 13/10* (2006.01)
*A61G 15/10* (2006.01)

(56) References Cited

U.S. PATENT DOCUMENTS

| | | | |
|---|---|---|---|
| 4,747,788 A | 5/1988 | Byrne | |
| 4,984,982 A | 1/1991 | Brownlie et al. | |
| 5,575,668 A | 11/1996 | Timmerman | |
| 5,709,156 A | 1/1998 | Gavaert et al. | |
| 5,980,279 A | 11/1999 | Muller | |
| 6,046,405 A | 4/2000 | Obermann | |
| 6,290,518 B1 | 9/2001 | Byrne | |
| 6,979,209 B2 | 12/2005 | Griepentrog | |
| 7,633,263 B2 | 12/2009 | Toya | |
| 7,674,119 B1 | 3/2010 | McCarthy | |
| 7,736,178 B2 | 6/2010 | Byrne | |
| D639,244 S | 6/2011 | Byrne | |
| 8,262,244 B2 | 9/2012 | Metcalf et al. | |
| 8,287,292 B2 | 10/2012 | Byrne | |
| 8,395,353 B2 | 3/2013 | Wang et al. | |
| 8,616,921 B2 | 12/2013 | Byrne et al. | |
| 8,690,590 B2 | 4/2014 | Byrne | |
| 8,944,266 B2 | 2/2015 | Roemer et al. | |
| 8,951,054 B2 | 2/2015 | Byrne et al. | |
| 9,312,673 B2 | 4/2016 | Byrne et al. | |
| 9,438,070 B2 | 9/2016 | Byrne et al. | |
| 9,531,145 B2 | 12/2016 | Byrne et al. | |
| 9,893,482 B2 | 2/2018 | Byrne et al. | |
| 10,050,473 B2 | 9/2018 | Byrne et al. | |
| 10,116,094 B2 | 10/2018 | Byrne et al. | |
| 2003/0042796 A1* | 3/2003 | Siu | G06F 1/266 307/39 |
| 2004/0026998 A1* | 2/2004 | Henriott | A47B 21/06 307/9.1 |
| 2005/0068019 A1 | 3/2005 | Nakamura et al. | |
| 2008/0121147 A1 | 5/2008 | Cooke et al. | |
| 2008/0200050 A1 | 8/2008 | Byrne | |
| 2009/0096413 A1 | 4/2009 | Partovi et al. | |
| 2009/0212638 A1 | 8/2009 | Johnson | |
| 2009/0278494 A1 | 11/2009 | Randall | |
| 2010/0290215 A1 | 11/2010 | Metcalf et al. | |
| 2012/0170292 A1 | 7/2012 | Bhosale et al. | |
| 2013/0207478 A1 | 8/2013 | Metcalf et al. | |
| 2015/0249343 A1 | 9/2015 | Makwinski et al. | |
| 2015/0303724 A1* | 10/2015 | Lin | H02J 7/007 320/162 |
| 2016/0022030 A1 | 1/2016 | Scott et al. | |
| 2016/0025316 A1 | 1/2016 | Chien | |
| 2016/0066130 A1* | 3/2016 | Bosua | G05F 1/12 375/257 |
| 2016/0153650 A1 | 6/2016 | Chien | |
| 2016/0233711 A1 | 8/2016 | Miller et al. | |
| 2017/0156490 A1 | 6/2017 | Newhouse | |
| 2017/0177031 A1 | 6/2017 | Lesizza et al. | |
| 2017/0224103 A1 | 8/2017 | Newhouse et al. | |
| 2017/0258246 A1 | 9/2017 | Schwalbach et al. | |
| 2017/0317458 A1 | 11/2017 | Byrne et al. | |
| 2017/0317533 A1 | 11/2017 | Byrne et al. | |

\* cited by examiner

ELECTRICAL RECEPTACLE FOR FURNITURE

CROSS-REFERENCE TO RELATED APPLICATIONS

The present application claims the filing benefits of U.S. provisional application Ser. No. 62/518,580, filed Jun. 12, 2017, which is hereby incorporated by reference herein in its entirety.

FIELD OF THE INVENTION

The present invention relates to electrical power and/or electronic data receptacle units that are mountable at furniture articles.

BACKGROUND OF THE INVENTION

Electrical power receptacle units and electronic data receptacle units that are mountable at furniture articles provide convenient access to electrical power and/or electronic data ports or receptacles, such as in work areas.

SUMMARY OF THE INVENTION

The present invention provides convenient access to electrical power at a furniture article, either from a dedicated power cord or an electrical distribution system, or from an electrical system already associated with the furniture article, such as an electrical system that provides electrically-actuated height or configuration adjustment. Indicia lamps provide an indication of whether each outlet is energized, and whether each outlet is actively supplying electrical power to an electrical consumer connected thereto.

According to one form of the present invention, an electrical power unit includes a housing that is mountable to a furniture article, an electrical outlet, an indicia lamp associated with the electrical outlet, and an electrical circuit for selectively illuminating the indicia lamp. The housing defines an interior cavity where the electrical outlet is positioned, such that the outlet is accessible through an opening formed in the housing. The electrical circuit is positioned in the interior cavity and is in electrical communication with a power source and with both the electrical outlet and the indicia lamp. The electrical circuit is operable to (1) illuminate the indicia lamp at a first luminous intensity when the electrical outlet is energized by the power source and the electrical outlet is not supplying electrical power an electrical power consumer, and (2) illuminate the indicia lamp at a second luminous intensity (such as a brighter intensity) when the electrical outlet is energized by the power source and the electrical outlet is supplying electrical power to an electrical power consumer, such as a smartphone, tablet computer, camera, or the like.

In one aspect, an electrical converter is provided in the housing's interior cavity, and is in electrical communication with the power source and with the electrical outlet. The electrical converter is configured to convert a high voltage AC or DC input, which is received from the power source, to a low voltage DC output at the electrical outlet, which may optionally be a USB charging outlet.

In another aspect, the electrical power unit is in combination with a furniture electrical system that includes at least one electric motor for adjusting a height or configuration of a furniture article. Such a furniture electrical system may be a high voltage DC system, such as a 12V to 48V DC system, and as such, an electrical power converter may be provided for reducing the voltage of the furniture electrical system to a lower DC power output, such as 5V DC, at the electrical power unit's electrical outlet.

In yet another aspect, the electrical power unit includes at least two of the electrical outlets in spaced arrangement, and an indicia lamp corresponding to each of the electrical outlets. Optionally, the electrical circuit can independently illuminate a first of the indicia lamps according to operation of a first electrical outlet, and can independently illuminate a second of the indicia lamps according to operation of a second electrical outlet.

In still another aspect, the electrical circuit includes a voltage comparator and a field effect transistor (FET) associated with each of the indicia lamps, for controlling the voltage (and therefore the luminous intensity) of each of the indicia lamps.

In a further aspect, an edge-mount clamp or an under-mount bracket is provided for securing the power unit's housing to a furniture article.

According to another form of the present invention, a furniture electrical system includes a housing defining an interior cavity, a mounting bracket, a low voltage DC electrical outlet, an electrical power cord, and an electrical power converter. The low voltage DC electrical outlet is positioned in an interior cavity of the housing, and is accessible through an opening formed in the housing. The electrical power cord passes through the housing and is adapted to engage and receive high voltage DC electrical power from an electrical supply that is associated with an electric motor for adjusting a height or configuration of the furniture article. The electrical converter is positioned in the interior cavity and is in electrical communication with the electrical power cord and the low voltage DC electrical outlet. The electrical converter is configured to convert the high voltage DC electrical power from the electrical supply to a low voltage DC output provided to the low voltage DC electrical outlet.

Therefore, the furniture electrical system or electrical power unit of the present invention provides users of a furniture article, in particular a furniture article having a power system for electric actuation of height-adjustment and/or configuration-adjustment mechanisms, with convenient access to low voltage electrical power outlets at or along the furniture article. Indicia lamps associated with each outlet of the electrical power unit provide users with a quick visual indication of each outlet's availability for charging use, and also may provide an indication of whether the outlet is actively charging or otherwise supplying power to a connected device. This can provide an indication that a charging cycle of the device has completed, which can be particularly helpful if the device itself is obscured from view or does not provide a clear indication that the charging cycle has ended.

These and other objects, advantages, purposes and features of the present invention will become apparent upon review of the following specification in conjunction with the drawings.

DESCRIPTION OF THE PREFERRED EMBODIMENTS

Figure 1:
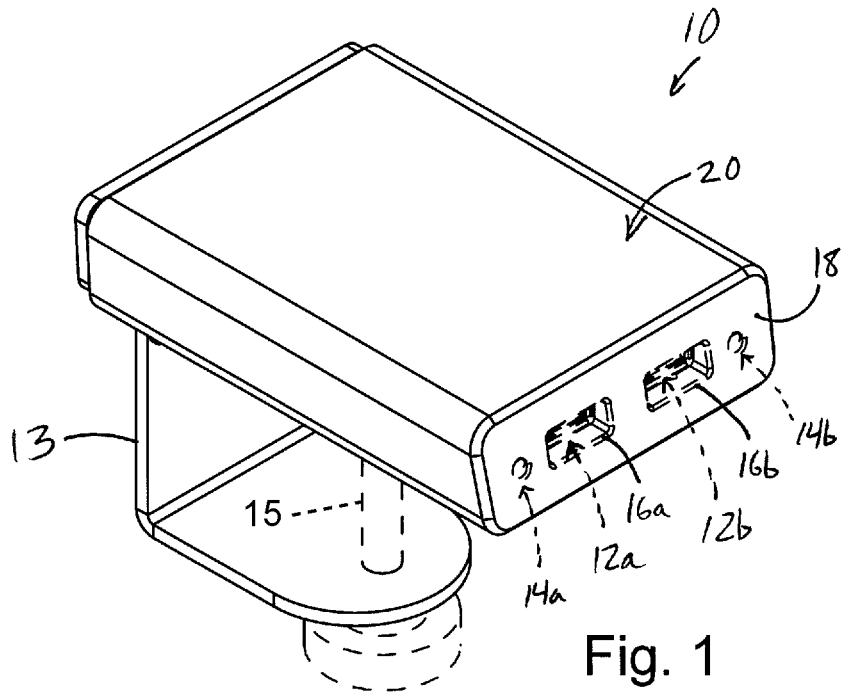
FIGS. 1-3 are perspective views of a two-outlet electrical receptacle unit in accordance with the present invention, shown fitted with an edge-mount clamp.
Figure 2:
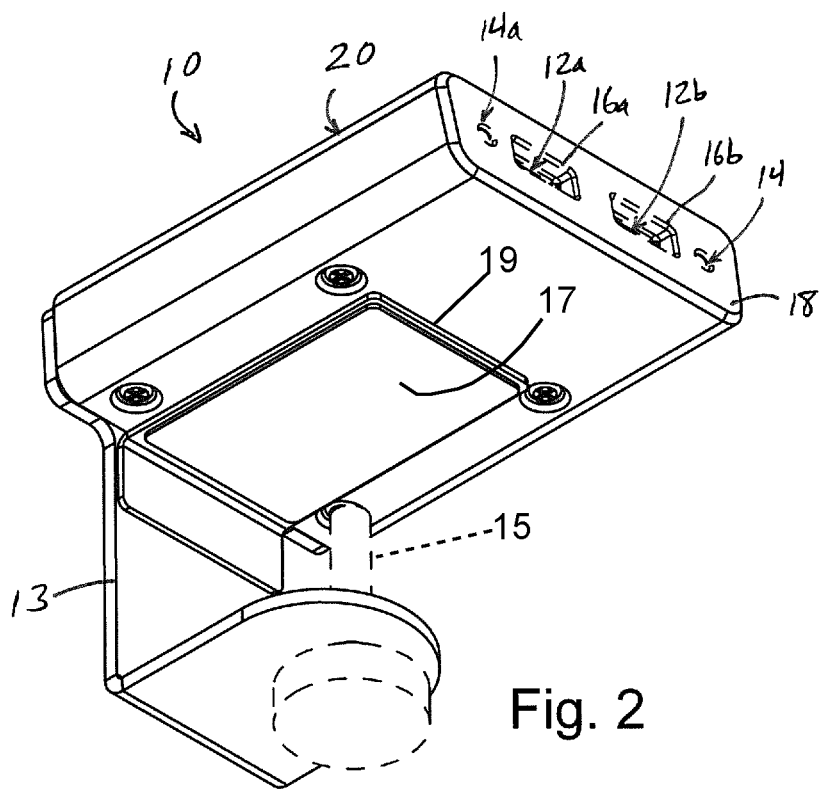
Figure 3:
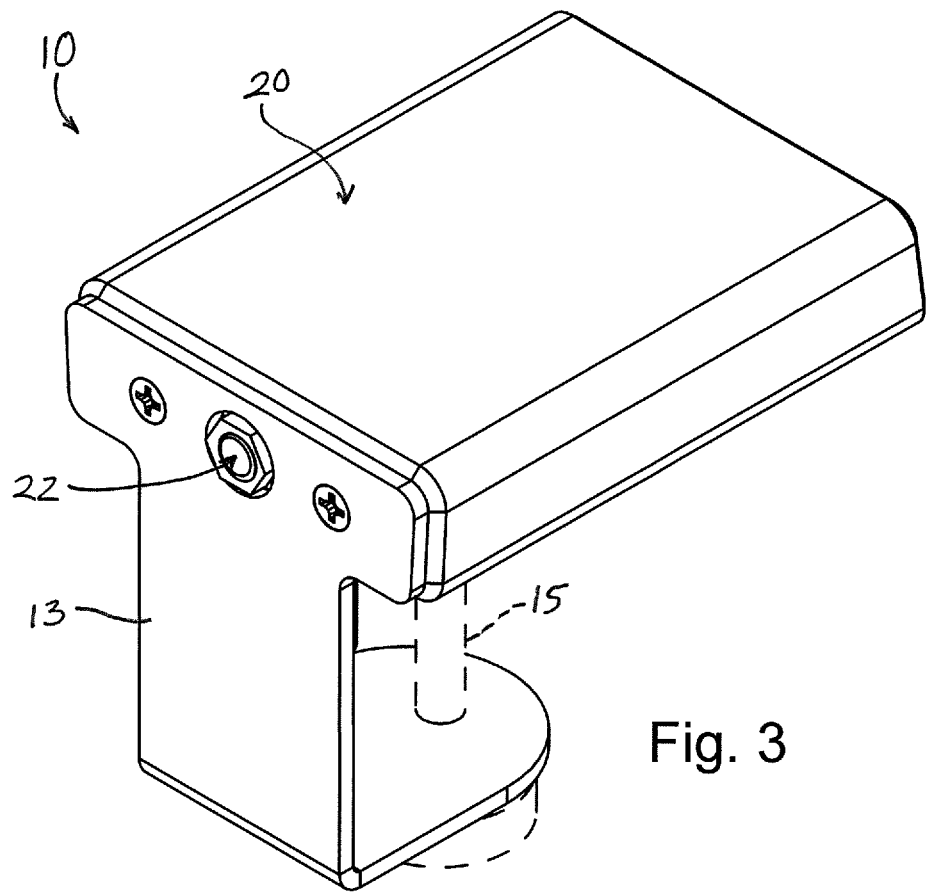
Figure 4:
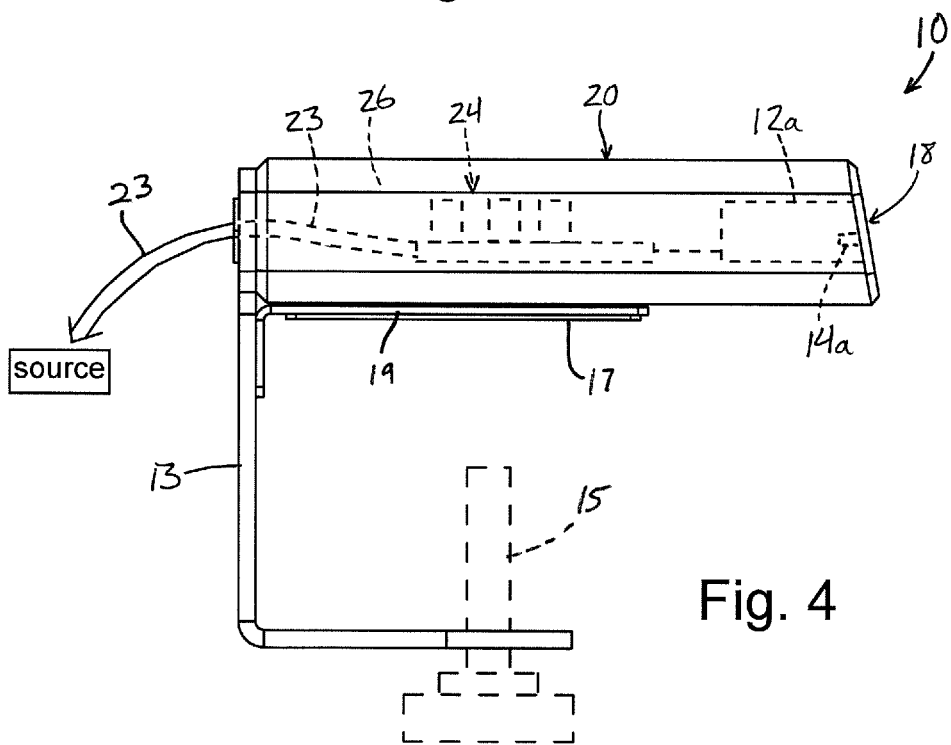
FIG. 4 is a right side elevation of the electrical receptacle unit and edge-mount clamp of FIGS. 1-3, with interior components shown in phantom.
Figure 5:
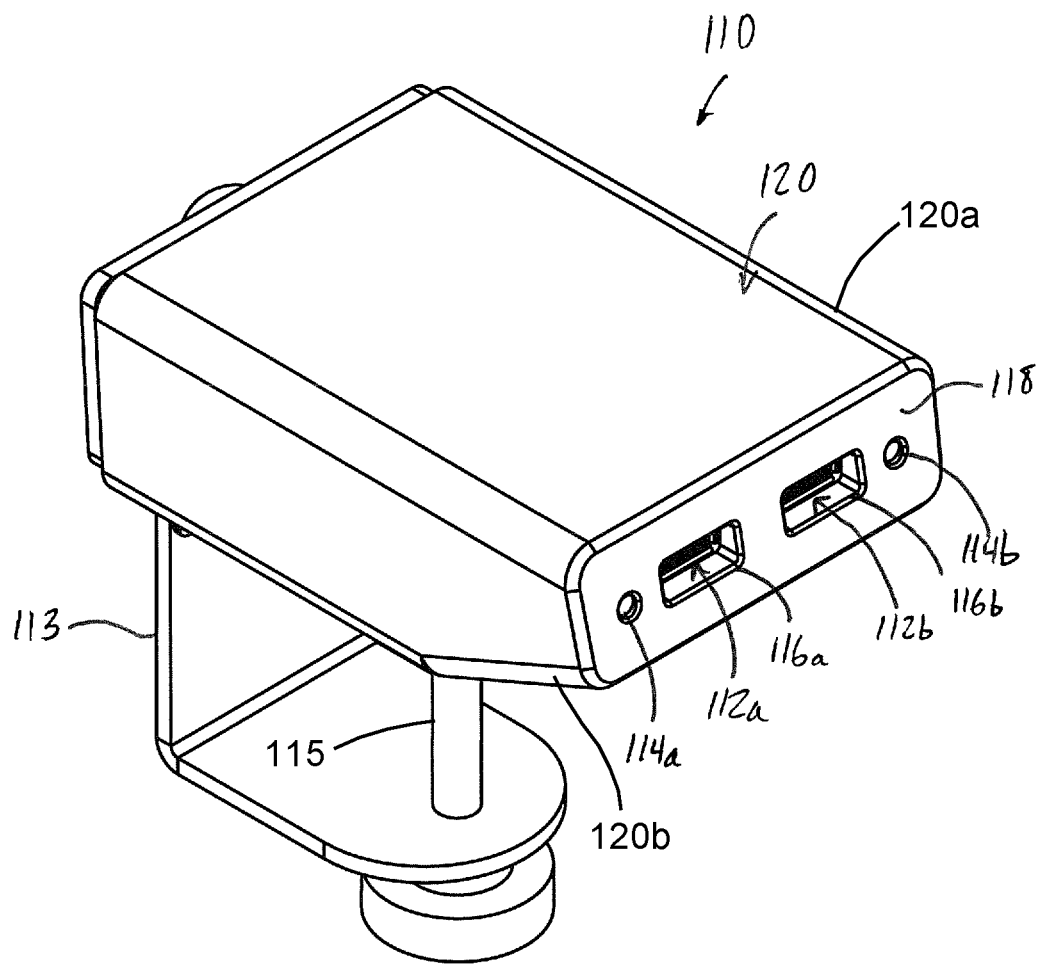
FIG. 5 is a perspective view of another two-outlet electrical receptacle unit in accordance with the present invention, shown fitted with an edge-mount clamp.

Referring now to the drawing and the illustrative embodiments depicted therein, an electrical receptacle unit 10 is attachable to furniture articles in order to provide users with convenient access to electrical power and/or electronic data. In the illustrated embodiment of FIGS. 1-4 and 11, electrical receptacle unit 10 includes two low voltage DC electrical receptacles 12a, 12b, an edge-mount bracket 13 for securing the unit to the edge of a shelf or work surface (such as a table, a desk, a countertop, or the like), or a wall divider or other furniture article. The receptacle unit 10 further includes a pair of indicia lamps 14a, 14b, each associated with a respective receptacle 12a, 12b. The electrical receptacles 12a, 12b are accessible through respective openings 16a, 16b formed in a forward surface 18 of a housing 20.

In the illustrated embodiment of FIGS. 1-4, an opening 22 (FIG. 3) at a rear end of housing 20, and at an upper end of bracket 13, permits electrical wiring or power cord 23 to pass into housing 20 and supply electrical energy to receptacles 12a, 12b. A thumbscrew 15 is provided for securing the bracket 13 to the edge of a table, desk, shelf, or other furniture article, and a friction pad 17 is provided to limit or prevent slippage of an upper bracket plate 19 along the furniture surface. An electrical circuit 24 is positioned in an interior cavity 26 defined by the housing 20, and is in electrical communication with a power source via the electrical wiring or power cord 23 that passes into housing 20 via opening 22. The electrical circuit 24 is also in communication with the electrical receptacles 12a, 12b and with the corresponding indicia lamps 14a, 14b. The electrical circuit 24, including electrical receptacles 12a, 12b and indicia lamps 14a, 14b, may be inserted into the housing 20 through an open rear end portion that is covered by an upper region of the bracket 13 during assembly.

The electrical circuit 24 is operable to independently illuminate the indicia lamps 14a, 14b at a first luminous intensity or color when the corresponding electrical receptacle 12a, 12b is energized by the power source and the electrical receptacle is not engaged by an electrical power consumer (such as an electrical plug associated with a smartphone, tablet computer, or another portable electrical or electronic device). The electrical circuit 24 is further operable to independently illuminate the indicia lamps 14a, 14b at a second luminous intensity or color that is different from the first luminous intensity or color when the corresponding electrical receptacle 14a, 14b is energized by the power source and the electrical receptacle is engaged by a plug associated with an electrical power consumer.

The charging ports 12a, 12b may be USB-style low voltage DC charging ports, as shown, accompanied by corresponding lamps 14a, 14b, such as LED indicator lamps. Optionally, different colors may be generated by the LED indicators 14a to provide these indications. The LED indicators 14a, 14b operate independently for each USB port 12a, 12b. When power is supplied to the electrical receptacle unit 10, but the receptacle is not in use, each LED indicator 14a, 14b will glow relatively dimly. Once a device (electrical consumer, such as a smartphone) is plugged into one of the USB ports 12a or 12b and charging begins, the corresponding LED indicator 14a or 14b increases in brightness. When the device is unplugged or charging completes, the LED indicator 14a or 14b returns to the dim setting. In this manner, the LED indicia lamps provide a user with a convenient visual indication of each outlet's availability for charging use, and of whether the outlet is actively charging or otherwise supplying power to a connected device. Thus, even if the device receiving power is obscured from the user's view or does not itself provide a clear indication of the end of a charging cycle, the indicia lamps provide a clear indication that a charging cycle has ended or power is no longer being supplied to a connected device.

Figure 12:
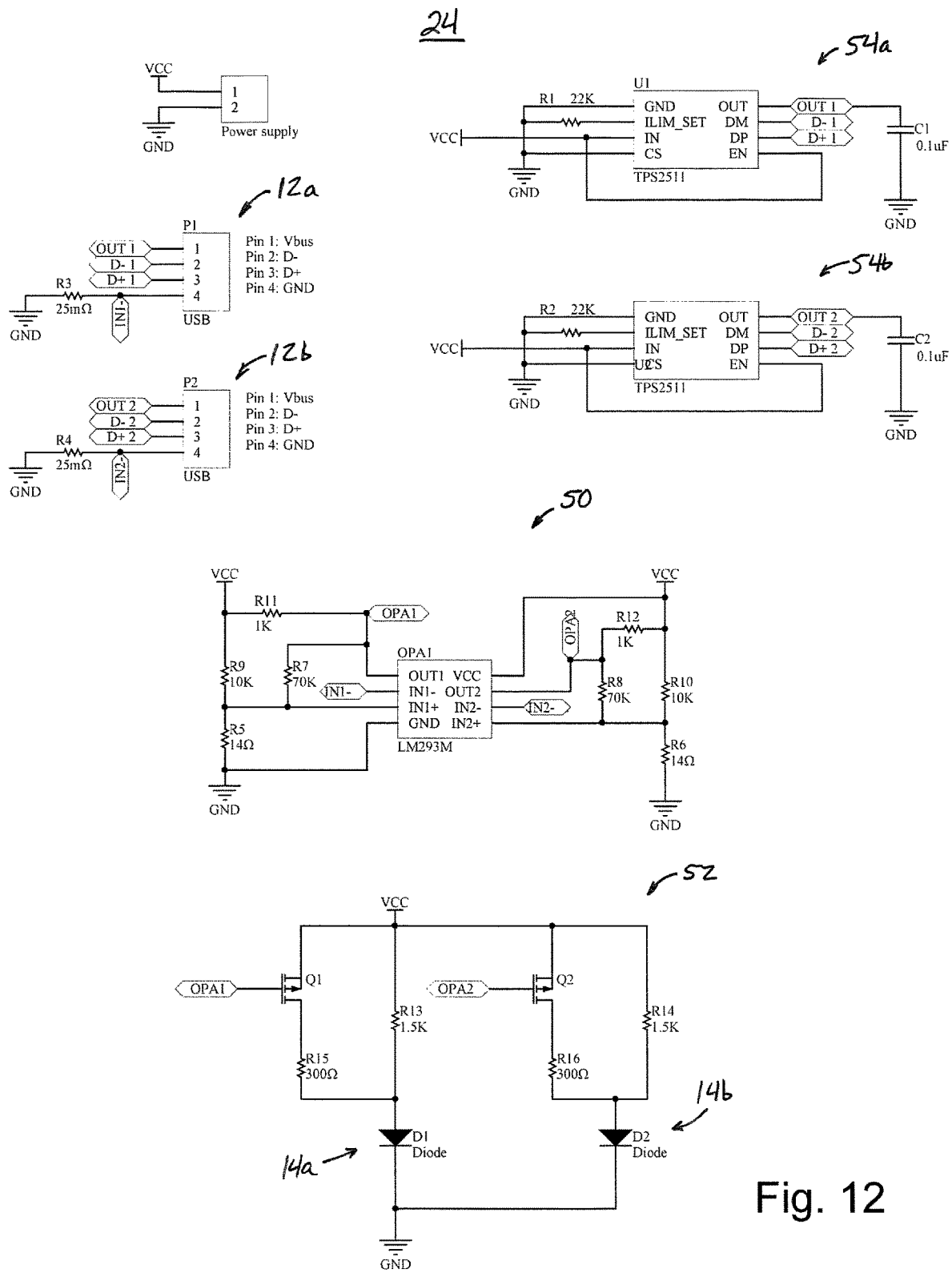
FIG. 12 is a circuit diagram for a circuit board associated with the two-outlet electrical receptacle units of FIGS. 1 and 5.

Referring to FIG. 12, a circuit diagram is provided for circuit board 24, which includes a voltage comparator circuit 50 (e.g., model LM293M, available from Fairchild Semiconductor Corp. of Portland, Me.) that is in communication with the USB ports 12a, 12b and with an illumination circuit 52 including LED indicators 14a, 14b. In addition, a pair of USB charging portion controllers 54a, 54b (e.g., model TPS2511, available from Texas Instruments Inc. of Dallas, Tex.) are provided for energizing the respective USB ports 12a, 12b. When a compatible USB plug is inserted into one of the USB ports 12a, 12b and begins drawing power, a small voltage will be present along that USB port's ground line, owing to the presence of a small resistor R3, R4 (in this case, 25 mΩ) along the ground line. That small voltage is directed to the IN1– or IN2– input of the comparator circuit 50, which compares that voltage (at IN1– or IN2–) to the fixed voltage sourced from the power supply (at IN1+ or IN2+), to thereby sense when an electrical consumer (such as a smartphone or tablet computer) is connected and drawing power from one of the USB ports 12a, 12b, generating a corresponding signal output at OPA1 or OPA2, which is received by illumination circuit 52.

The illumination circuit 52 includes a field effect transistor (FET) for each LED indicator. When power is available at each USB port 12a, 12b but is not being drawn by a connected electrical consumer, voltage in the ground line of each USB port is zero, which is detected by the comparator circuit 50, and the corresponding FET in the illumination circuit 52 causes electrical power to be supplied through a single resistor (R13 for first LED indicator 14a, R14 for second LED indicator 14b) at a reduced voltage to illuminate the corresponding LED indicator 14a, 14b at a relatively dim illumination. However, when power is available at each USB port 12a, 12b and, due to the presence of voltage in the ground line of the corresponding USB port, the comparator circuit 50 detects that one or both USB ports 12a, 12b is actively supplying power to a connected electrical consumer, and the FET brings a second resistor (R15 for first LED indicator 14*a*, R16 for second LED indicator 14*b*) into parallel with its corresponding first resistor (R13 or R14) to reduce the overall resistance across the FET and thereby direct a higher voltage, thus illuminating the corresponding LED indicator 14*a*, 14*b* at a brighter illumination level.

Figure 11:
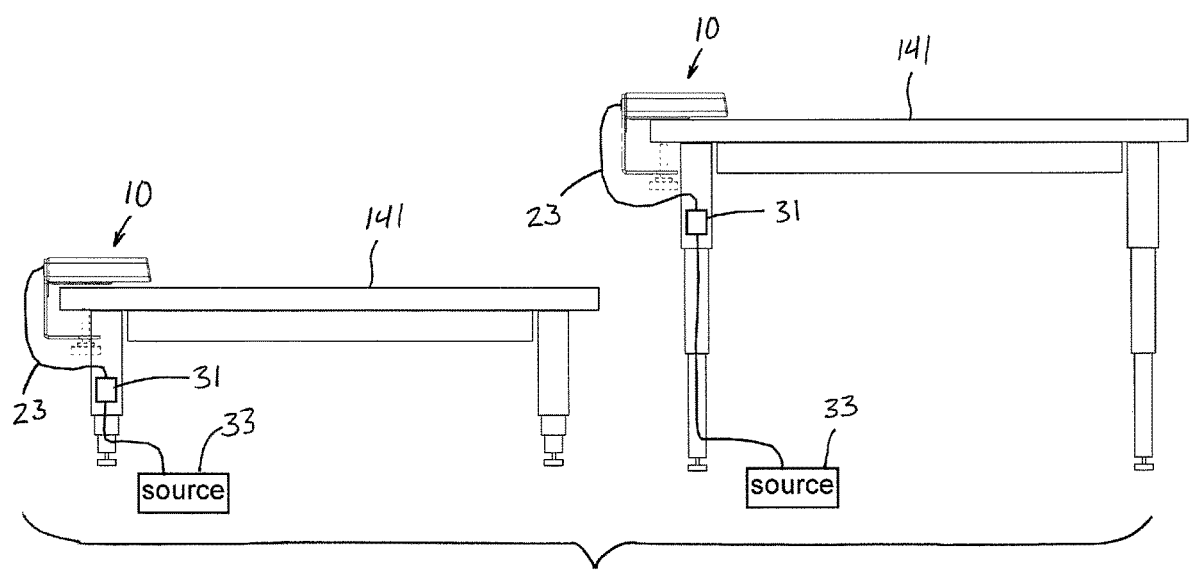
FIG. 11 is a pair of side elevation views of a height-adjustable table fitted with the electrical receptacle unit and edge-mount clamp of FIGS. 1-4, shown in lowered and raised configurations.

Power to circuit board 24 may be supplied from a conventional 110V or 220V AC electrical outlet. Therefore, it is envisioned that electrical power converter circuitry may be provided at the circuit board 24, for converting an incoming high voltage AC power to low voltage DC power. However, it is further envisioned that the electrical receptacle unit 10 may be configured to receive DC voltage from 12V to 48V and provides 2A at 5V at each port 12*a*, 12*b*. For example, electrically actuated height-adjustable or configuration-adjustable furniture, such as work tables, sit-stand desks, medical exam tables, and dental exam chairs, are often equipped with one or more DC motors 31 that operate on DC voltage of about 12V to 48V, which is received from an AC-to-DC power converter receiving power from a conventional 110V or 220V AC power source 33, such as shown in FIG. 11. The electrical receptacle unit 10 can be electrically coupled, by a power cord 23, to the DC voltage that is provided to the electric motor 31. When the DC voltage supplied to the motor 31 exceeds the voltage desired at the outlets 12*a*, 12*b*, electrical power converter circuitry may be provided at circuit board 24, for lowering the incoming elevated DC voltage to a reduced DC voltage.

Optionally, and with reference to FIGS. 5-9, another electrical receptacle unit 110 is similar in many respects to electrical receptacle unit 10, with comparable components given like numerals with the addition of 100, so that a general understanding of the electrical receptacle unit 110 may be readily obtained with reference to the above description. Aside from the use of a two-piece housing 120, differences in housing shape, and the presence of a strain-relief or grommet 128 at a cord pass-through opening 122 formed in a bracket 113, the main functional difference between electrical receptacle unit 110 and receptacle unit 10 is the presence of both an electrical circuit board 124 and an electrical power converter 125 in the interior cavity 126 of the receptacle unit. Electrical power converter 125 is provided for converting either a high voltage AC or DC input received (via power cord 123) from the power source to a low voltage DC output at the electrical receptacles 112*a*, 112*b*. A pair of butt splice connectors 121 may be provided for securing the electrical conductors of the power cord 123 to terminals or other conductors of the electrical power converter 125.

Figure 10:
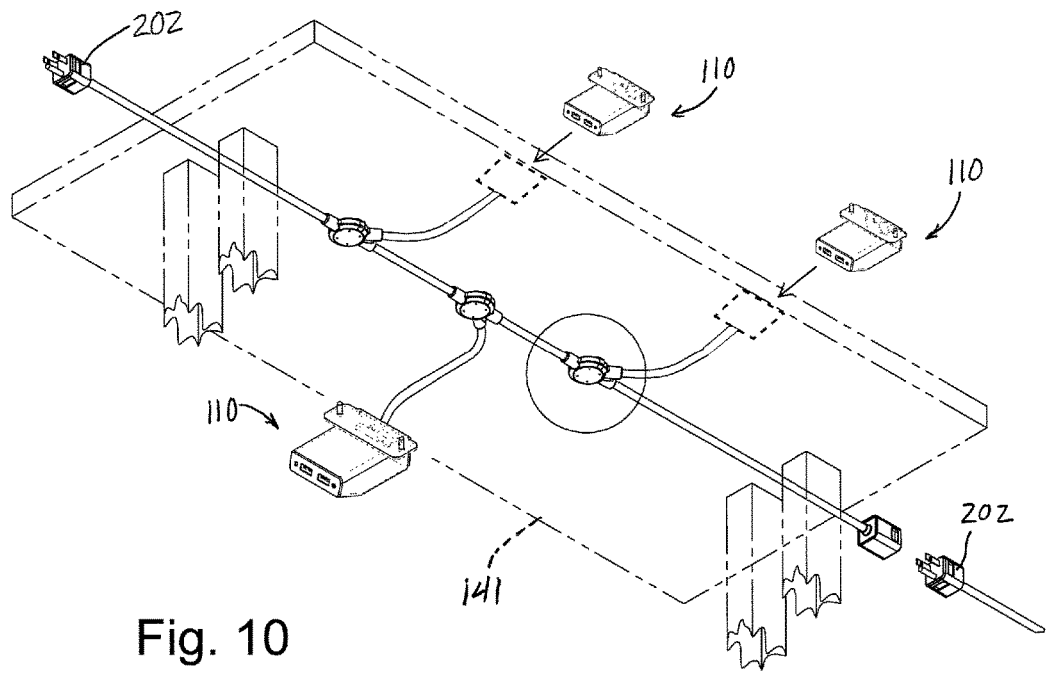
FIG. 10 is a semi-diagrammatic perspective view of the underside of a table fitted with an electrical distribution system having three of the electrical receptacle units of FIG. 8.

Electrical circuit 124 includes two charging USB ports 112*a*, 112*b* each accompanied by a corresponding LED indicator lamp 114*a*, 114*b*. High voltage AC or DC power enters the housing 120 via cord 123, and the electrical power converter 125 converts it to 2A at 5V DC or other suitable power output required to charge a phone or similar device. The output of electrical power converter 125 is then provided to electrical circuit board 124 via a short electrical cord 127. Optionally, multiple electrical receptacle units 110 may be connected by a branched cord assembly 200 with a circuit breaker plug 202, such as shown in FIG. 10. Similar branched cord assemblies 200 are more fully described in commonly-owned U.S. Pat. No. 9,531,145, which is hereby incorporated herein by reference in its entirety.

Figure 6:
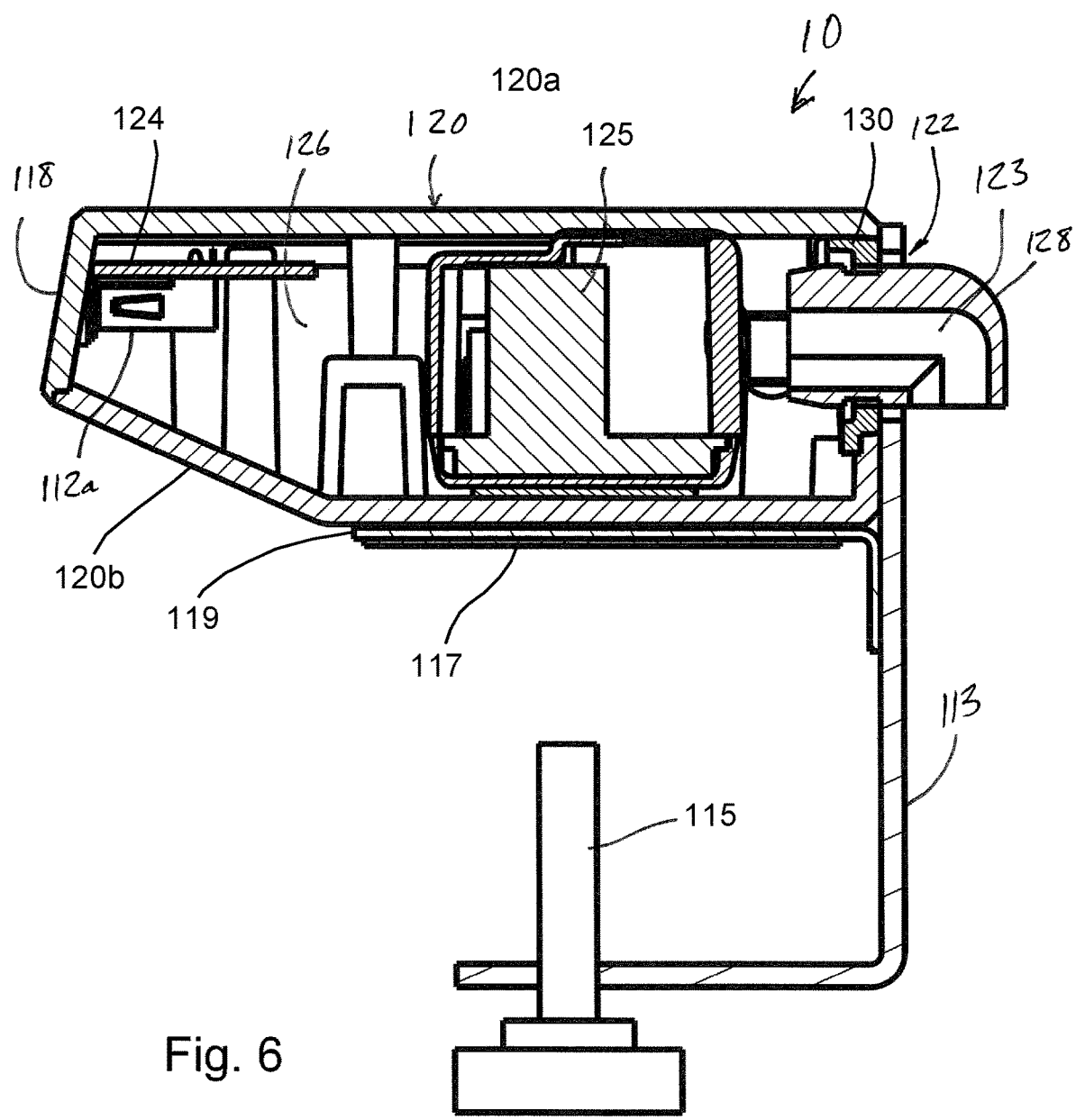
FIG. 6 is an enlarged side sectional view of the electrical receptacle unit and edge-mount clamp of FIG. 5.
Figure 7A:
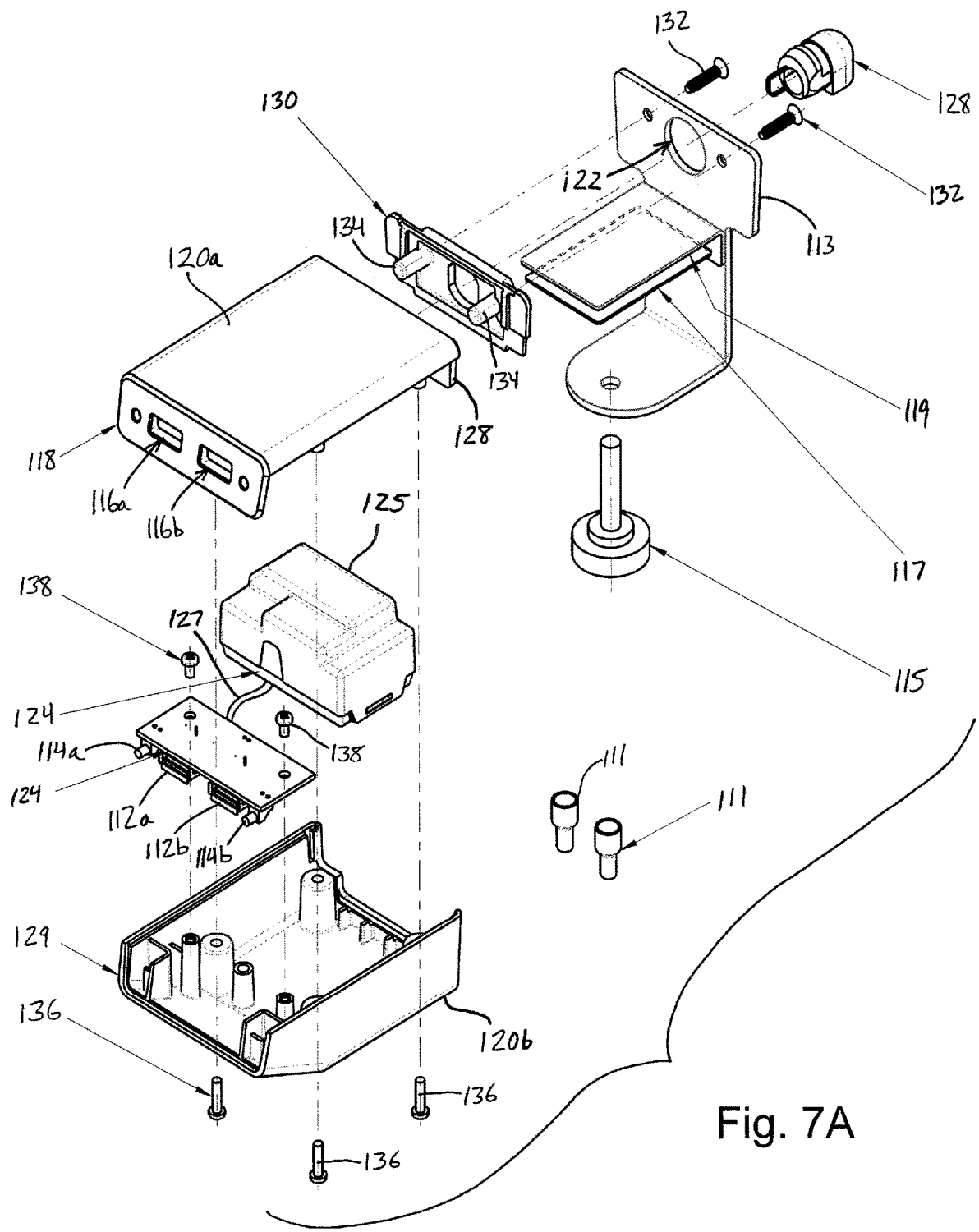
FIGS. 7A-7C are exploded perspective views of the electrical receptacle unit and edge-mount clamp of FIG. 5.
Figure 7B:
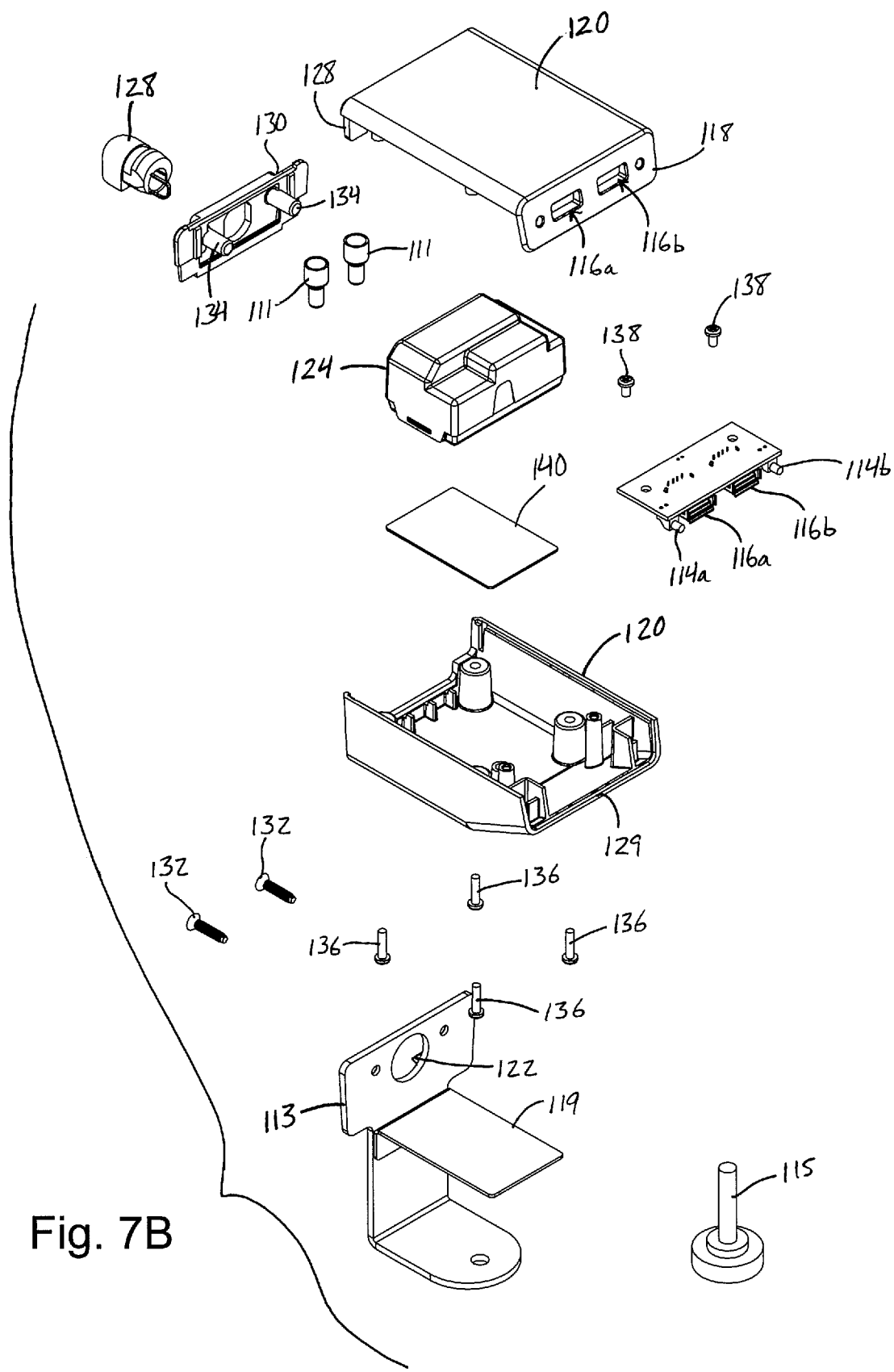
Figure 7C:
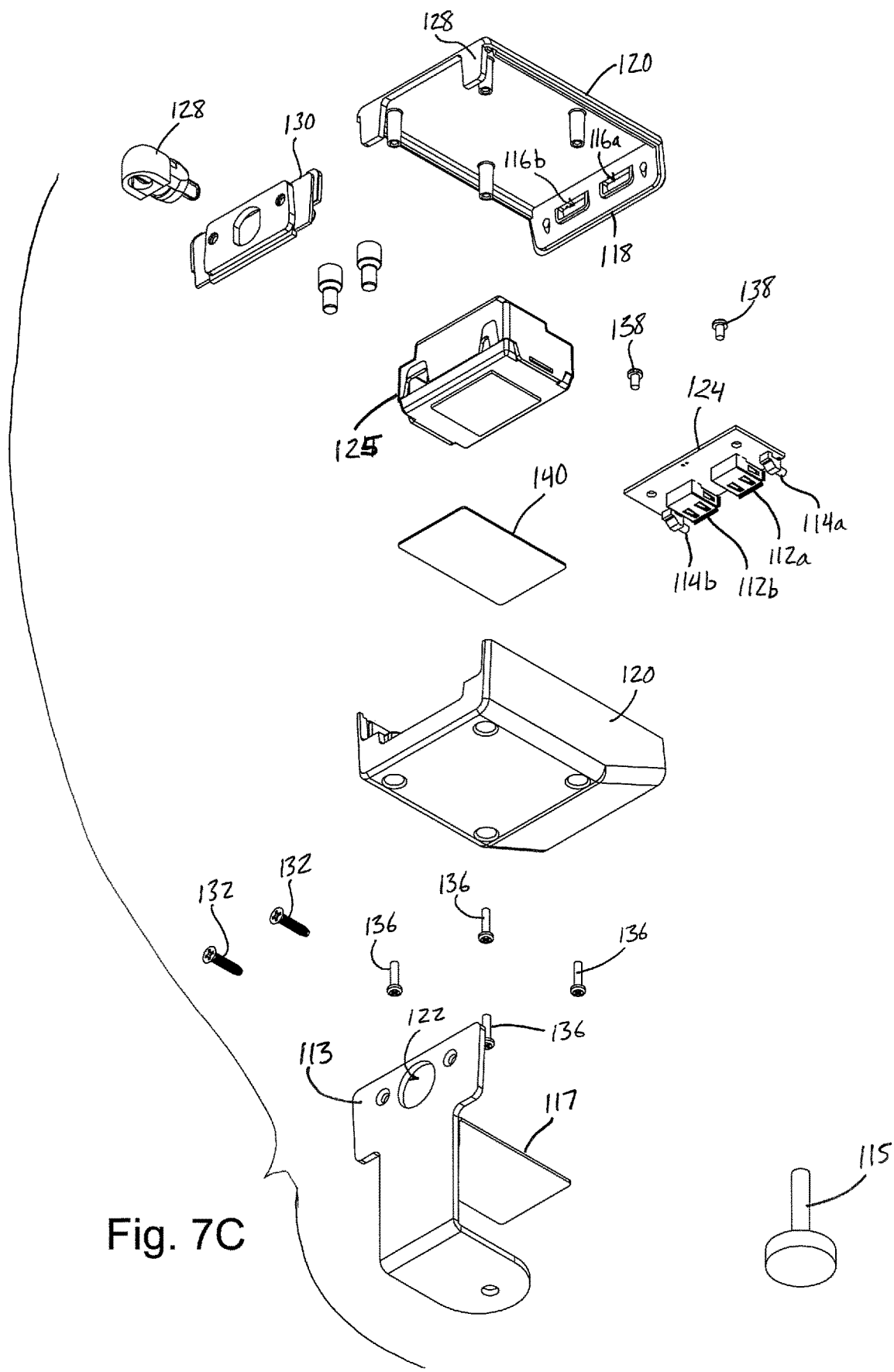
Figure 8:
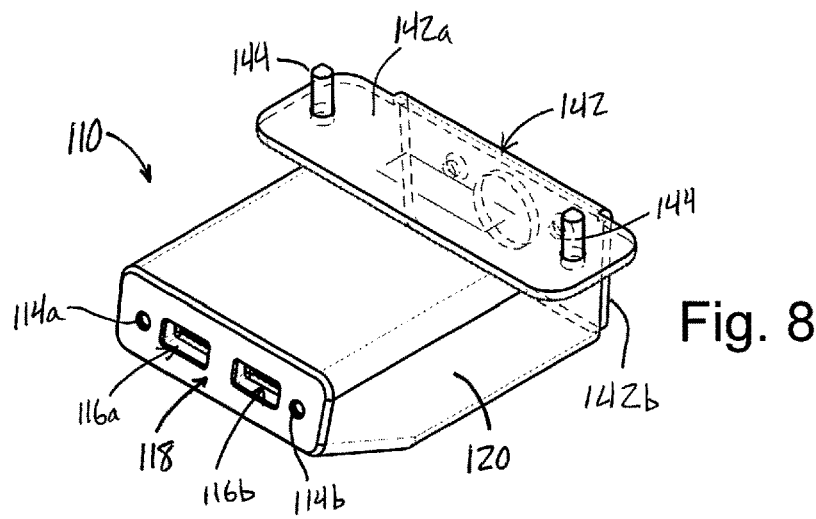
FIG. 8 is a perspective view of the electrical receptacle unit of FIG. 5, shown fitted with an under-mount bracket.
Figure 9:
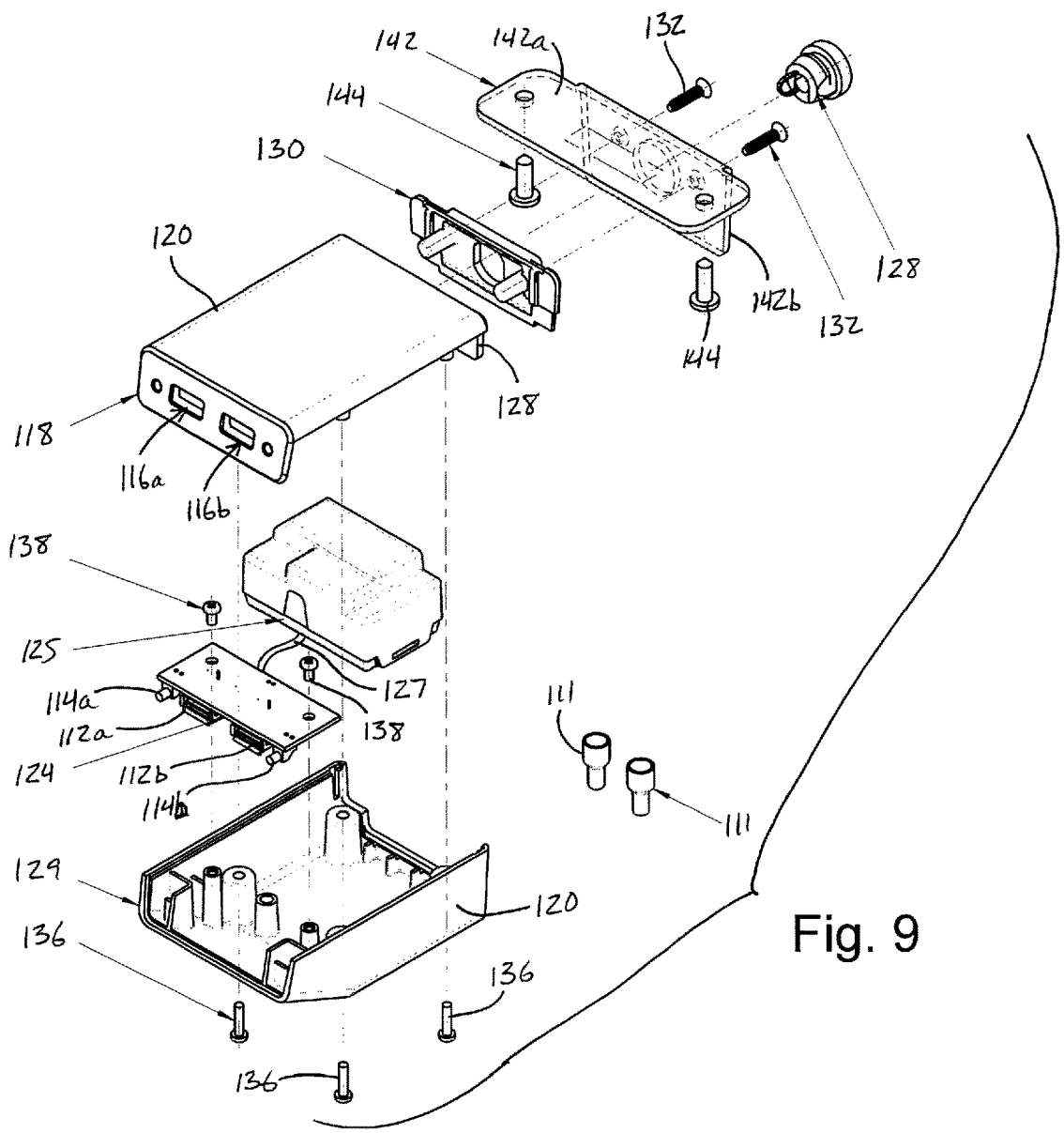
FIG. 9 is an exploded perspective view of the electrical receptacle unit and under-mount bracket of FIG. 8.

Two-piece housing 120 including an upper housing portion 120*a* and a lower housing portion 120*b* that mate together as shown in FIGS. 6, 7A and 9, permitting installation of the electrical circuit 124. Upper housing portion 120*a* includes forward surface 118 with a lower end 118*a* that engages a forward lip 129 of lower housing portion 120*b*, and also includes a rear surface 128 that is engaged by a backing plate 130, which facilitates attachment to bracket 113, as best shown in FIG. 7A. Bracket 113 is secured to housing 120 by a pair of bracket screws 132 that are received in respective screw bosses 134 of the backing plate 130, which is captured at the rear of housing 120 when the upper housing portion 120*a* is secured to the lower housing portion 120*b* by a plurality of housing screws 136. A pair of circuit board screws 138 secure the circuit board 124 to the lower housing portion 120*b*, while electrical power converter 125 is large enough to substantially fill the vertical space within interior cavity 126 between the upper and lower housing portions, so that it is sufficient to provide an adhesive pad 140 (FIGS. 7B and 7C) to secure the converter 125 to the lower housing portion 120*b* during assembly.

The electrical receptacle unit 110 may be provided with attachment brackets that clamp to an edge, as in the edge-mount clamp brackets 13 described above, and the corresponding clamp 113 of FIGS. 5-7A. Many other types of mounting are envisioned, including under-mount brackets 142 that are designed to fasten to the underside of a table 141 (or a desk, countertop, bar, or shelf, etc.), such as shown in FIG. 10. Under-mount brackets 142 have an inverted-L shape, including an upper horizontal leg 142*a* that receives a pair of fasteners 144 for securing the bracket 142 to the underside of a furniture article, such as table 141. A downwardly-extending lower leg 142*b* has a similar shape and configuration of the bracket 13, 113, and interfaces with the receptacle unit's backing plate 130 in the same manner.

Accordingly, the present invention provides convenient access to electrical power at a furniture article, either from a dedicated power cord or electrical distribution system, or from an electrical system already associated with the furniture article, such as an electrical system installed in or along the furniture for energizing electric motors used for powered height adjustment and/or configuration adjustment of the furniture.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. An electrical power unit for furniture, said electrical power unit comprising:

a housing that is mountable to a furniture article and that defines an interior cavity;

an electrical outlet positioned in said interior cavity and accessible through an opening formed in said housing;

an indicia lamp associated with said electrical outlet;

an electrical circuit disposed in said interior cavity and in electrical communication with a power source and with each of said electrical outlet and said indicia lamp;

said electrical outlet comprising a grounded conductor having a resistor disposed in line therealong;

wherein said electrical circuit is operable to develop a voltage along said grounded conductor in response to said electrical outlet supplying electrical power to an electrical power consumer;

wherein said electrical circuit is operable to illuminate said indicia lamp at a first luminous intensity when said electrical outlet is energized by the power source and said electrical outlet is not supplying electrical power to the electrical power consumer;

wherein said electrical circuit is operable to illuminate said indicia lamp at a second luminous intensity that is different from said first luminous intensity when said electrical outlet is energized by the power source and said electrical outlet is supplying electrical power to the electrical power consumer; and wherein said electrical circuit comprises a voltage comparator and a first transistor, wherein said voltage comparator is operable to output a signal to said first transistor when said voltage comparator detects a voltage along said grounded conductor, wherein said first transistor is configured to cause a first voltage to develop along a first resistor in parallel with a second resistor when the signal is received, and wherein said first transistor is further configured to cause a second voltage to develop along only the second resistor when the signal is not received, and wherein the luminous intensity of said indicia lamp is variable according to whether the first voltage or the second voltage has developed along the second resistor.

2. The electrical power unit of claim 1, further comprising an electrical converter disposed in said interior cavity and in electrical communication with the power source and with said electrical outlet, wherein said electrical converter is configured to convert a high voltage AC or DC input received from the power source to a low voltage DC output at said electrical outlet.

3. The electrical power unit of claim 2, further in combination with a furniture electrical system including an electric motor adapted to adjust a height or configuration of a furniture article.

4. The electrical power unit of claim 3, wherein said electrical converter is configured to receive a high voltage DC input from said furniture electrical system.

5. The electrical power unit of claim 4, wherein the high voltage DC input from said furniture electrical system comprises about 12V to 48V, and wherein the low voltage DC output at said electrical outlet comprises about 5V.

6. The electrical power unit of claim 5, wherein said electrical outlet comprises a low voltage USB charging outlet.

7. The electrical power unit of claim 1, comprising at least two of said electrical outlets in spaced arrangement and at least two of said indicia lamps corresponding to respective ones of said electrical outlets, wherein said electrical circuit is configured to independently illuminate a first of said indicia lamps according to operation of a first of said electrical outlets, and said electrical circuit is configured to independently illuminate a second of said indicia lamps according to operation of a second of said electrical outlets.

8. The electrical power unit of claim 7, wherein said electrical circuit comprises a voltage comparator and a field effect transistor (FET) associated with each of said indicia lamps, wherein said voltage comparator is in electrical communication with said grounded conductor of each of said low voltage DC electrical outlets, said voltage comparing a voltage along the grounded conductor to a fixed voltage to determine when the electrical power consumer is connected and drawing power from one or more of said at least two electrical outlets.

9. The electrical power unit of claim 1, further comprising an edge-mount clamp or an under-mount bracket for securing said housing to a furniture article.

10. A furniture electrical system comprising:
a housing defining an interior cavity;
a mounting bracket for securing said housing to a furniture article;
a low voltage DC electrical outlet positioned in said interior cavity and accessible through an opening formed in said housing;
an electrical power cord passing through said housing and adapted to engage and receive high voltage DC electrical power from an AC-to-DC electrical supply that supplies the high voltage DC electrical power directly to an electric motor for adjusting a height or configuration of the furniture article;
an electrical converter disposed in said interior cavity and in electrical communication with said electrical power cord and with said low voltage DC electrical outlet, wherein said electrical converter is configured to convert the high voltage DC electrical power from the electrical supply to a low voltage DC output at said low voltage DC electrical outlet;
an indicia lamp associated with said low voltage DC electrical outlet; and
an electrical circuit board disposed in said interior cavity and in electrical communication with said electrical converter, wherein said electrical circuit board supports said low voltage DC electrical outlet and said indicia lamp;
wherein said electrical circuit is operable to illuminate said indicia lamp at a first luminous intensity when said low voltage DC electrical outlet is energized and said low voltage DC electrical outlet electrical outlet is not supplying electrical power to an electrical power consumer, and wherein said electrical circuit is operable to illuminate said indicia lamp at a second luminous intensity that is different from said first luminous intensity when said low voltage DC electrical outlet is energized and said low voltage DC electrical outlet is supplying electrical power to an electrical power consumer; and
wherein said electrical circuit board comprises a first voltage comparator and a first transistor, wherein said first voltage comparator is operable to output a first signal to said first transistor when said first voltage comparator detects said low voltage DC electrical outlet supplying electrical power to the electrical power consumer, and wherein said first transistor is configured to cause a voltage to develop along a first resistor in parallel with a second resistor when the signal is received, otherwise, the voltage only develops along the second resistor, and wherein a change in luminous intensity is defined by whether said low voltage DC electrical outlet is supplying electrical power to the electrical power consumer.

11. The furniture electrical system of claim 10, comprising at least two of said low voltage DC electrical outlets in spaced arrangement and at least two of said indicia lamps corresponding to respective ones of said low voltage DC electrical outlets, wherein said electrical circuit board is configured to independently illuminate a first of said indicia lamps according to operation of a first of said low voltage DC electrical outlets, and said electrical circuit board is configured to independently illuminate a second of said indicia lamps according to operation of a second of said low voltage DC electrical outlets.

12. The furniture electrical system of claim 10, wherein said second luminous intensity is greater than said first luminous intensity.

13. The furniture electrical system of claim 12, wherein said electrical circuit comprises a voltage comparator and a field effect transistor (FET) associated with each of said indicia lamps.

14. The furniture electrical system of claim 13, wherein each of said low voltage DC electrical outlets comprises a grounded conductor having a resistor disposed in line therealong, wherein a voltage is developed along said grounded conductor in response to said low voltage DC electrical outlet supplying electrical power to an electrical power consumer, and wherein said voltage comparator is in electrical communication with said grounded conductor of each of said low voltage DC electrical outlets.

15. The furniture electrical system of claim 10, further comprising said electric motor and said electrical supply associated with said electric motor.

16. The furniture electrical system of claim 10, wherein the high voltage DC electrical power comprises about 12V to 48V, and wherein an output of said low voltage DC electrical outlet comprises about 5V.

17. The furniture electrical system of claim 10, further comprising an edge-mount clamp or an under-mount bracket for securing said housing to a furniture article.

18. The furniture electrical system of claim 10, wherein said low voltage DC electrical outlet comprises a USB charging outlet.

* * * * *